Aug. 8, 1933.          B. L. BOBROFF          1,921,149
                      HOSPITAL INDICATOR
                     Filed June 15, 1928          2 Sheets-Sheet 1
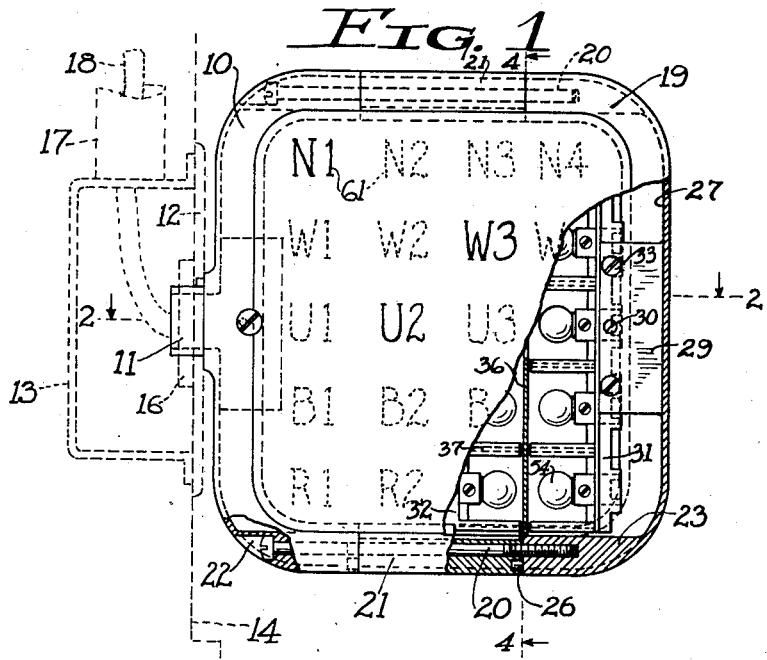
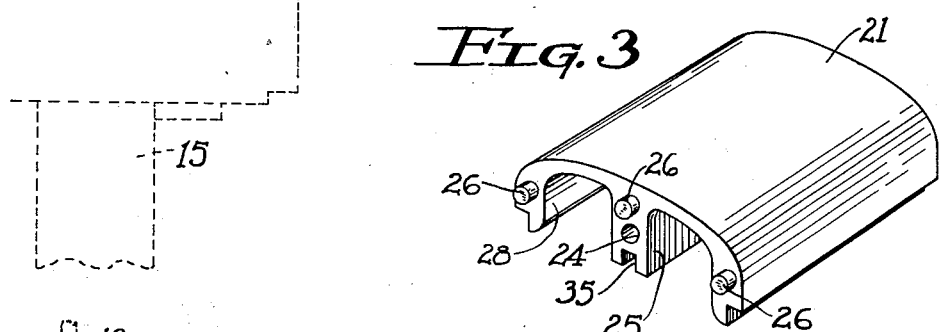
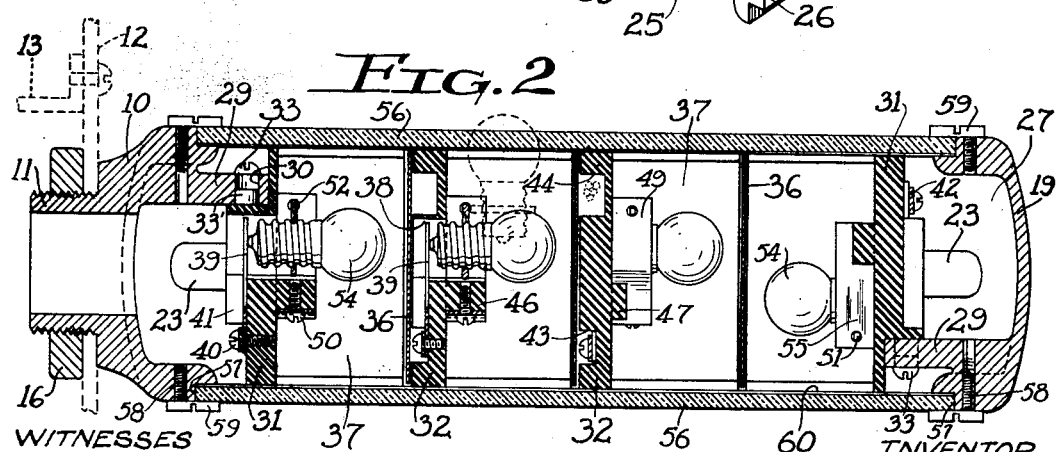
WITNESSES
INVENTOR
Barnett L. Bobroff
By R. S. Caldwell
ATTORNEY Aug. 8, 1933.   B. L. BOBROFF   1,921,149
HOSPITAL INDICATOR
Filed June 15, 1928   2 Sheets-Sheet 2
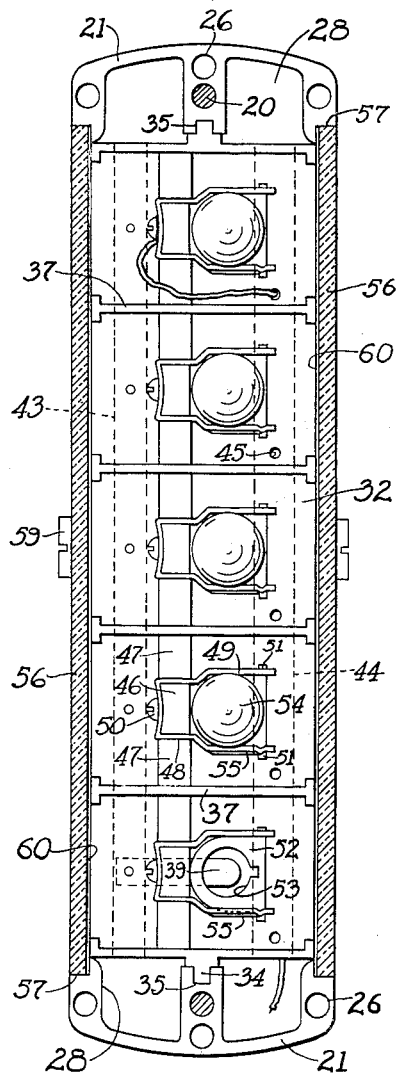
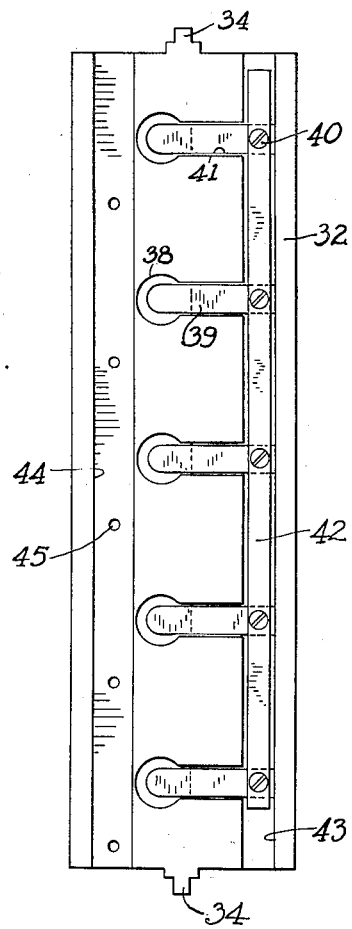

Patented Aug. 8, 1933

1,921,149

UNITED STATES PATENT OFFICE 1,921,149

HOSPITAL INDICATOR

Bornett L. Bobroff, Milwaukee, Wis.

Application June 15, 1928. Serial No. 285,695

8 Claims. (Cl. 177—329)

The invention relates to indicators and more particularly to indicators adapted for use in hospitals to indicate to nurses on duty the wants of patients.

An object of the invention is to provide an indicator of simple and compact construction adapted for disposition over the door of a hospital room to be visible along the corridor on which the room opens for indicating to nurses on duty the wants of one or more patients within the room.

Another object of the invention is to provide an indicator permitting the use of a variable number of indicating elements to serve rooms having different numbers of patients, and to provide sectional indicating units, one for each patient, each unit including a plurality of indicating elements.

A further object is to construct an indicator in such manner that it will facilitate wiring and assembly and permit the convenient replacement of indicating lamps.

The invention further consists in the several features hereinafter set forth and more particularly defined by the annexed claims.

This construction constitutes a continuation in part of my co-pending application for Signalling systems, Serial No. 204,892, filed July 11, 1927.

In the accompanying drawings, Fig. 1 is a side elevation of an indicator embodying the invention, parts being broken away and parts being shown in section;

Fig. 2 is a transverse sectional view of the indicator taken on the line 2—2 of Fig. 1;

Fig. 3 is a perspective detail view of a sectional frame or casing element for the indicator;

Fig. 4 is a sectional elevation of the indicator taken on the line 4—4 of Fig. 1; and Fig. 5 is a detail elevation of a sectional indicating unit for the indicator.

In these drawings, the numeral 10 designates a C-shaped frame or casing member disposed in a vertical plane and carrying an integral hollow boss 11 at an intermediate portion lying on a horizontal axis. The hollow boss 11 projects through the front plate 12 of a junction box 13 disposed within a corridor wall 14 above the door 15 of the patients' room or ward, and a lock nut 16 is threaded onto the end portion of the boss 11 to fixedly secure the casing member 10 to the front plate. A conduit 17 communicates with the junction box 13 and receives one or more wiring cables 18 which pass inwardly through the hollow boss 11 of the casing 10.

Another C-shaped casing member 19, generally similar to the casing member 10, but without the boss 11, is secured to the casing member 10 by horizontal screws 20 in the upper and lower portions of these casing members, and in the present instance these casing members are spaced from each other by intermediate casing members 21 interposed therebetween. Each screw 20 has a head portion disposed within a recess 22 in the casing member 10 and has a threaded end screwed into the casing member 19. Each screw 20 extends within intermediately disposed inwardly-projecting flanges 23 on the casing members 10 and 19 and passes through a bore 24 in a similar registering flange 25 formed within the intermediate casing member 21. For positioning and aligning the casing members 21, each of these casing members is provided with a number of projections 26 which enter and fit within corresponding recesses formed in the casing member 10, and the other end of each casing member 21 is provided with recesses receiving similar projections 26 formed on the abutting end of the casing member 19. In this manner the casing members 10, 19 and 21 may be accurately assembled and retained in their proper relative positions.

The interior portions of the casing members 10 and 19 have wiring channels 27 which are divided by the flanges 23 at their upper and lower ends, and these divided channels then register with similar channels 28 formed in the intermediate casing members 21. The casing members 10, 19 and 21 may be formed in any suitable material, such as metal, or they may be formed of insulating material, such as a phenolic condensation product.

The casing members 10 and 19 are each provided with a vertically disposed flange 29 offset from the central plane of these members and provided with transverse openings 30. A lamp support 31 is secured to each flange 29 by screws 33 passing through openings in the flanges and threaded into the supports. An aligning boss or projection 33' formed on each lamp support 31 enters one of the openings 30 in the adjacent flange 29 to properly locate the lamp support within the casing. Each lamp support 31 is well spaced from the peripheral walls of the casing members 10 and 19 to facilitate wiring. Other vertically-disposed lamp supports 32, similar to the lamp supports 31, extend between the opposite intermediate casing members 21 and are provided with ribs 34 at their upper and lower ends which enter and fit closely within channels 35 formed in the inner edges of the flanges 25. The lamp supports 31 and 32 may be separated by thin vertically-disposed partitions 36, but these are not entirely essential.

The lamp supports 31 and 32 are each preferably formed of suitable insulating material, such as a phenolic condensation product or other hardened plastic material, and each includes a vertically-extending portion having projecting therefrom a number of spaced horizontally-extending integrally-formed partitions 37, which may be suitably re-enforced at their edges, as by flanges. Horizontally-extending lamp-receiving openings 38 extend through the lamp supports 31 and 32 between the partitions 37, and a number of resilient contact members 39 in the form of flat springs have their free ends extending transversely into the openings 38 and are secured at their other ends by screws 40 threaded into the lamp supports. The contact springs 39 are preferably disposed in channels 41 to facilitate assembly and to maintain them in their proper position. The contact springs are joined by a connection strip 42 also held in place by the screws 40, and in the case of each lamp support 32 the connection strip is disposed in a vertically-extending channel 43 near one side edge of the support. If desired, the contact springs may be formed integrally with their connection strip. At the other side edge of each lamp support 32 is placed a vertically-extending wiring channel 44 which communicates at its ends with the wiring channels 28 in the casing sections 21. Openings 45 are formed through the vertically-extending portion of each lamp support 32 in communication with the wiring channel 44 to receive conductor wires therethrough.

Between the horizontal partitions 37 of the lamp supports are provided vertically aligned projections 46 and 47, the centrally-located projection 46 between each pair of partitions 37 being spaced from the projections 47 to form horizontally-extending slots 48. A U-shaped sheet metal member 49 has parallel leg portions fitting within the slots 48 and includes a connecting portion which is apertured to receive and attaching terminal screw 50 which is threaded laterally into the projection 46. The face of the projection 46 receiving the connecting portion of the U-shaped member 49 is preferably slightly concave as shown in Fig. 4 to permit the attaching screw 50 to displace the resilient portion of the U-shaped member and thereby not only act as a spring means for locking the screw in position but also hold the U-shaped member firmly in position. Near the free ends of its leg portions the U-shaped sheet metal member 49 is apertured to receive the pintles or trunnions 51 of a pivotally-mounted sheet metal lamp-holding member 52 which includes a circular opening 53, the edges of which are skewed to present a screw thread receiving the threaded base of an indicating lamp 54. A detent portion 55 is provided in one leg of the U-shaped member 49 to retain the lamp-holding member 52 in its normal position. The lamp 54 threaded into the lamp-holding member 52 engages, at its insulated center contact, with the resilient leaf contact 39 projecting into the opening 38.

In the present instance, five lamps are provided on each sectional lamp support for the purpose effecting the display of appropriate signals for each patient. A transparent or translucent plate 56, conveniently of glass, is carried on each side of the indicator frame or casing and has edge portions disposed in the rabbetted edge portions 57 of the casing members. The glass plates 56 may be retained in position in any appropriate manner, such as by means of screws 58 having eccentric heads 59 engaging the plates, in order that the plates may be removed when required. Each glass plate 56 carries on its inner face a translucent film 60 which is provided with appropriate indicia 61 in register with the cells or compartments formed between the partitions 37 of the lamp supports. It is also possible to form the indicia directly on the glass plates. The indicia provided in the present instance consist of the letters "N", "W", "U", "B" and "R", corresponding to appropriate wants of a patient, such as "nurse", "water", "urinal", "bed-pan" and "remove", and the indicia for each lamp compartment also includes a numeral designating the bed number, thus "N—1" designates "nurse—bed 1", "W—2" designates "water—bed 2". Each patient is thereby provided with his own set of signals, which may be displayed independently of the others. The wiring for the various lamps, not shown in detail, is disposed in the interior channels 27 and 28 in the casing members and in the channels 44 of the lamp supports, thereby facilitating the connection and placement of the wires. The indicator lamps may be controlled in any appropriate manner, preferably as shown in applicant's co-pending application, Serial No. 267,455, filed April 4, 1928.

When it becomes necessary to replace a lamp that has burnt out, one of the glass plates 56 is removed by turning its retaining screws 58 and the burnt-out lamp is grasped by the fingers to swing its holder 52 to the dotted line position shown in Fig. 2, thereby permitting the lamp to be readily screwed out of position. The new lamp is then screwed into the holder and the holder swung back into its normal position in which the center contact of the lamp again engages the contact spring 39.

When the room served by the indicator has only one or two beds the indicator may be assembled with the casing members 10 and 19, omitting the intermediate casing members 21, and in such event the lamp supports 32 are omitted. When a single bed is to be served only one lamp support or unit 31 need be used. When a ward containing more than four beds is to be served, it is only necessary in assembling the indicator to include additional or longer intermediate casing members 21 together with additional sectional lamp supports 32 as required.

The invention provides an indicator of simple and compact construction capable of convenient assembly and wiring, accommodating varying conditions of practice and being well suited for its intended purpose. The indicator is also adapted for use in sanitariums and other institutions and is useful generally for the display of a plurality of signals.

What I claim as new and desire to secure by Letters Patent is:

1. In an indicator, the combination, with a casing, of stationary lamp supports carried therein in close relation and extending transversely of a face of the indicator, each support comprising a base portion having partitions thereon forming lamp compartments, and swingable lamp supporting members disposed in said compartments and carried by said support.

2. In an indicator, the combination, with a casing, of a lamp support carried therein comprising an insulating base portion having lamp-receiving apertures therethrough, a plurality of lamp contacts carried on one side of said base portion and each having a portion in register with a corresponding aperture, a plurality of swingably mounted lamp contacts carried on the opposite side of said base portion adjacent said apertures, lamps carried on said swingably mounted lamp contacts and entering said apertures to engage the contacts on the other side of said base portion, and releasable means for retaining said lamps in engagement with said contacts.

3. In an indicator, the combination, with a casing, of an insulating lamp support within said casing having a lamp-receiving aperture therethrough, a lamp contact carried at one side of said casing in register with said aperture, a U-shaped member secured to the other side of said lamp support, a second lamp contact swingably mounted on said U-shaped member and disposed adjacent said aperture, a lamp carried by said second named contact and extending through said aperture to engage said first named contact, and releasable means for retaining said lamps in engagement with said contacts.

4. In an indicator, the combination of a loop-shaped casing having an interior wiring channel, and a plurality of adjacent substantially parallel lamp supports secured transversely within said casing and each having a longitudinally extending wiring channel registering at an end with an intermediate portion of said casing wiring channel.

5. An indicator, comprising a loop-shaped casing including opposite casing members of E-shaped cross-section each having a longitudinally extending interior rib, and a plurality of substantially parallel lamp-supporting units extending transversely in said casing and having at their opposite ends separable tongue-and-groove connections with said interior ribs.

6. An indicator, comprising pairs of opposite casing members forming a loop-shaped casing, a pair of said opposite casing members being of E-shaped cross-section and each having a longitudinally extending interior rib, a plurality of lamp-supporting units extending transversely in said casing and carried at their end portions on said ribs, and means connecting said casing members and extending longitudinally through said ribs.

7. In an indicator, the combination of a casing having a lamp compartment including an open side at a face of the casing and a compartment wall extending transversely of said face, a diaphanous cover for said open side removable therefrom, a U-shaped member in said compartment mounted on and lying flat against said wall, a lamp in said compartment, and means for conducting current to said lamp including a lamp contact disposed between the legs of said U-shaped member and pivotally carried thereon, said lamp being releasably mounted in said lamp contact and said contact being swingable on said U-shaped member to bring said lamp partially out of the open side of said compartment and with the lamp axis directed through said open side for facilitating removal and replacement of said lamp.

8. An indicator comprising a casing having separable end and intermediate members and having a face, substantially parallel lamp supports extending within said casing transversely of said face, said intermediate casing members and the end portions of said lamp supports having separable tongue-and-groove connections extending along said intermediate casing members and parallel to said face to permit reception of a variable number of supports, and a plurality of indicating lamps carried by said supports.

BORNETT L. BOBROFF.